United States Patent
Lin et al.

(10) Patent No.: US 8,683,241 B2
(45) Date of Patent: Mar. 25, 2014

(54) METHODS AND SYSTEM FOR REDUCING BATTERY LEAKAGE IN AN INFORMATION HANDLING SYSTEM

(75) Inventors: Hsien Tsung Lin, Shin-Chuang (TW);
Chih-Chieh Yin, Keeling (TW);
Chin-Jui Liu, Xizhi (TW)

(73) Assignee: Dell Products L.P., Round Rock, TX (US)

( * ) Notice: Subject to any disclaimer, the term of this patent is extended or adjusted under 35 U.S.C. 154(b) by 614 days.

(21) Appl. No.: 12/647,393

(22) Filed: Dec. 25, 2009

(65) Prior Publication Data

US 2011/0161699 A1    Jun. 30, 2011

(51) Int. Cl.
*G06F 1/26* (2006.01)
*H02J 7/00* (2006.01)

(52) U.S. Cl.
USPC ............................ 713/320; 307/150; 320/132

(58) Field of Classification Search
USPC ........................................................ 713/320
See application file for complete search history.

(56) References Cited

U.S. PATENT DOCUMENTS

| | | | |
|---|---|---|---|
| 6,072,250 A * | 6/2000 | Thandiwe et al. | 307/150 |
| 6,545,447 B1 * | 4/2003 | Smith | 320/132 |
| 6,992,987 B2 | 1/2006 | Kobayashi | |
| 7,068,686 B2 | 6/2006 | Kobayashi | |
| 7,088,741 B2 | 8/2006 | Kobayashi | |
| 7,136,946 B2 | 11/2006 | Shirley | |
| 7,177,329 B2 | 2/2007 | Kobayashi | |
| 2010/0138092 A1* | 6/2010 | Kohn | 701/22 |

* cited by examiner

*Primary Examiner* — Kim Huynh
*Assistant Examiner* — Vincent Chang
(74) *Attorney, Agent, or Firm* — Baker Botts L.L.P.

(57) ABSTRACT

A method for reducing current leakage in a battery in communication with an information handling system (IHS). The method includes providing a battery management unit (BMU) in the battery, the BMU in communication with an embedded controller (EC), the BMU in a standby mode while the battery is coupled to the IHS, and configuring the BMU to exit the standby mode if an external power supply is coupled to the IHS. Also disclosed is an IHS which includes an EC in communication with a BMU, a power switch in communication with the EC and the BMU, and a control switch configured to be switched on if an external power supply is coupled to the IHS or if the power switch is activated without the external power supply, wherein the BMU unit exits the standby mode if the control switch is switched on.

18 Claims, 3 Drawing Sheets

METHODS AND SYSTEM FOR REDUCING BATTERY LEAKAGE IN AN INFORMATION HANDLING SYSTEM

TECHNICAL FIELD

The present disclosure relates generally to the field of information handling systems, and more specifically, to configuring a battery coupled to an information handling system.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (IHSs), including portable IHSs for example, may operate with a rechargeable battery as their power source. Commonly used rechargeable batteries may include lead and/or sulfuric acid, nickel cadmium (NiCd), nickel metal hydride (NiMH), lithium ion (Li-ion), or lithium ion polymer (Li-ion polymer) batteries. Such batteries may be recharged for repeated use with portable IHSs.

A portable IHS may be provided to retail locations, or directly to customers, with a battery coupled to the portable IHS so that customers may immediately operate the IHS after purchase. In some instances, the portable IHS may remain at the retail location for an extended period of time without being purchased. Unfortunately, during this time, without actively being charged, the battery may experience current leakage, for example, approximately in the range of 2-5 milliamps (mA), while coupled to the portable IHS. Such leakage may be so small as to avoid detection by a battery management unit (BMU) in the battery but large enough to eventually exhaust all battery power. As a result, the battery may "die" by the time the portable IHS is purchased and/or used and may be unable to be recharged. Such occurrences may cause considerable frustration to the consumer as well as increased costs associated with honoring warranties on the portable IHS and/or battery.

Additionally, a battery may also be prone to leakage in other instances. For example, if a consumer were to leave the battery coupled to the portable IHS without an external power supply coupled to the IHS for an extended period, the battery may suffer from similar leakage previously described.

Previous attempts to prevent such battery leakage have proven inadequate in a number of ways. For example, one solution may be to separate the portable IHS from the battery in different packages before delivery. Thus, the battery may not be coupled to the portable IHS until a user desires to use the portable IHS for the first time. However, for companies and/or manufacturers not already implementing such a procedure, this solution may require redesigning the packing process, thereby undesirably impacting the manufacturing process of portable IHSs.

Another alternative may be to execute a utility to force the BMU into a standby mode before delivery. While the BMU is in standby mode, the battery may be disabled from providing power. Once an external power supply is coupled to the IHS, the BMU may exit the standby mode. This solution, however, may suffer from the fact that the utility may be necessary to place the BMU in the standby mode. Practically, once the BMU exits standby mode, it may never be able to enter standby mode again. Thus, users who leave a battery coupled to the IHS without an external power supply for an extended period of time may still experience a failed battery. Furthermore, this solution may still impact the manufacturing process by having to execute the utility in the first place.

Thus, a need exists for systems and methods for reducing battery leakage in an IHS while the battery is coupled to the IHS without an external power supply.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure provides a method for reducing current leakage in a battery in communication with an information handling system (IHS). The method includes providing a battery management unit (BMU) in the battery, the BMU in communication with an embedded controller, wherein the BMU comprises a detector pin. The method further includes placing the BMU in a standby mode to disable power from the battery to the IHS while the battery is coupled to the IHS, and configuring the BMU to exit the standby mode, if an external power supply is coupled to the IHS, to enable battery power from the battery to the IHS.

Another aspect of the disclosure provides a method for reducing current leakage in a battery in communication with an information handling system (IHS), the method. The method includes providing a battery management unit (BMU) in the battery, the BMU in communication with an embedded controller, wherein the BMU comprises a detector pin. The method further includes placing the BMU in a standby mode to disable power from the battery to the IHS while the battery is coupled to the IHS, and activating a power switch in communication with the battery management unit and the embedded controller. Furthermore, the method includes configuring the BMU to exit the standby mode to enable the battery to provide power to the IHS.

Yet another aspect of the disclosure provides an information handling system (IHS) which includes an embedded controller operable to initiate a power-on sequence in the IHS, and a battery having a battery management unit (BMU), wherein the BMU is initially placed in a standby mode to disable battery power to the IHS, the BMU in communication with the embedded controller. The system may further include a power switch in communication with the embedded controller and the BMU, and a control switch configured to be switched on if an external power supply is coupled to the IHS or if the power switch is activated without the external power supply, wherein the BMU unit exits the standby mode if the control switch is switched on, thereby enabling battery power to the IHS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
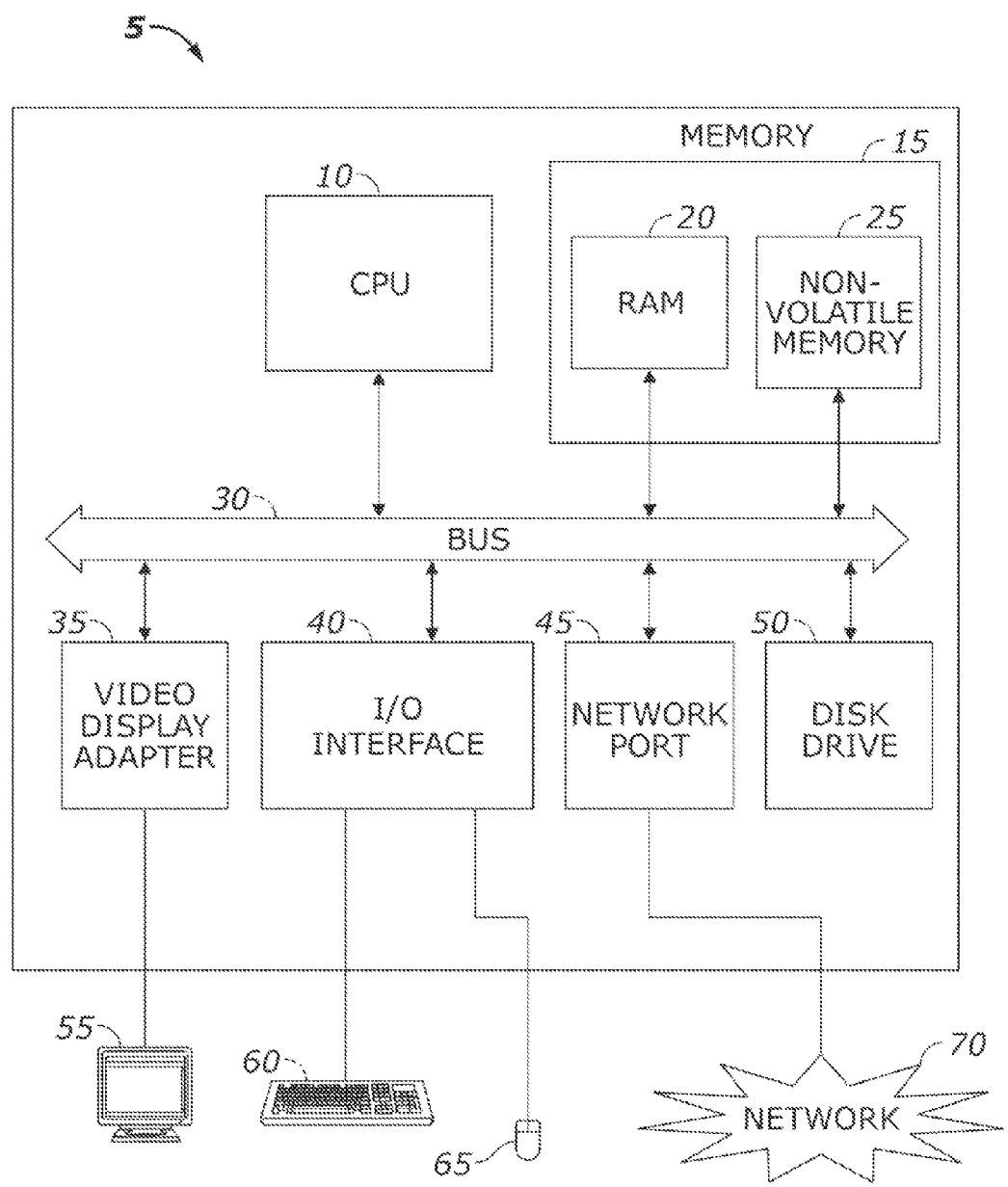
FIG. 1 represents an information handling system (IHS) in accordance with one aspect of the present disclosure.

Before the present system and methods are described, it is to be understood that this disclosure is not limited to the particular system and methods described, as such may vary. One of ordinary skill in the art should understand that the terminology used herein, is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a battery" may refer to one or several batteries, and reference to "a method for reducing" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
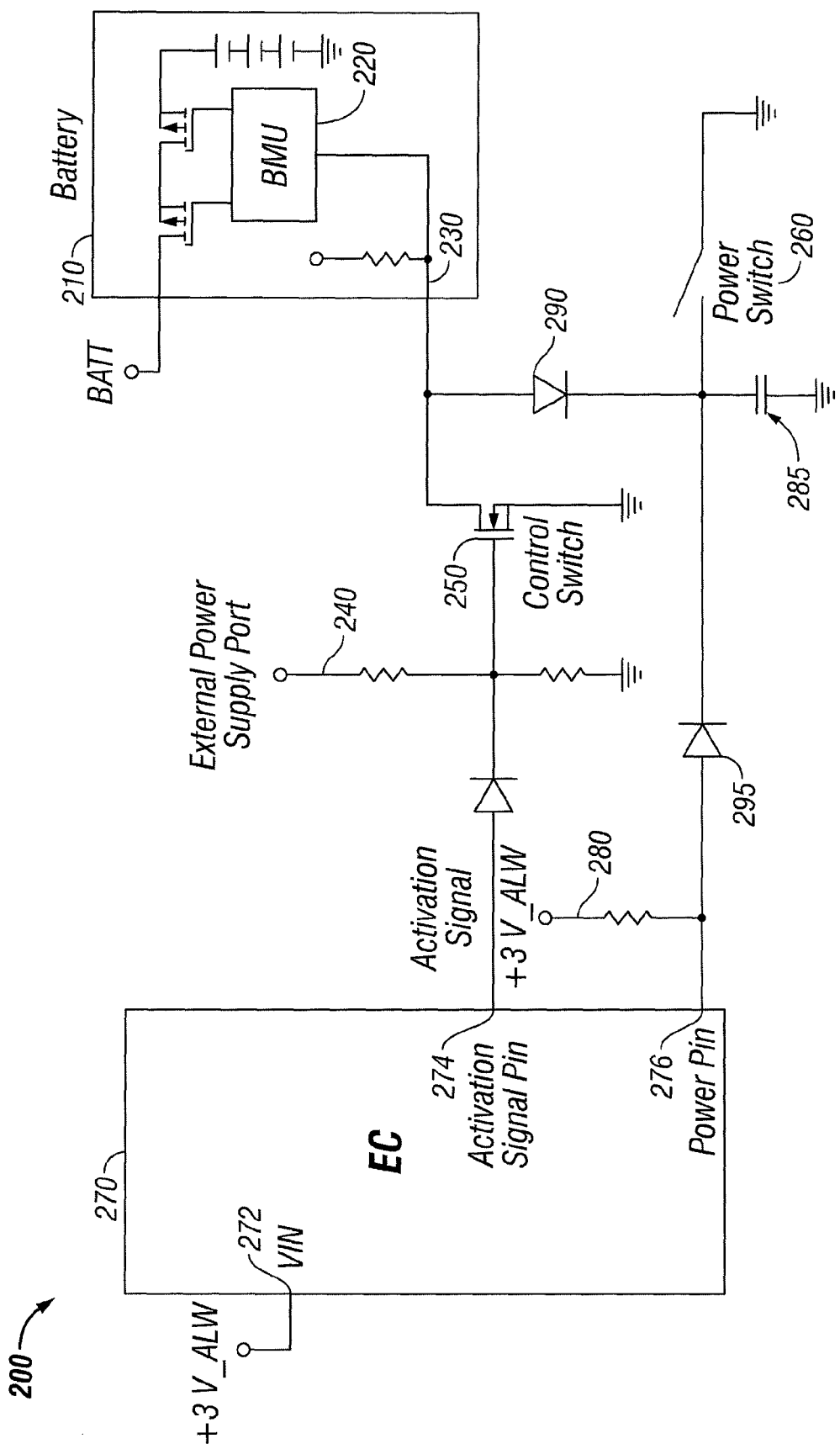
FIG. 2 represents a portable IHS in accordance with one aspect of the present disclosure.

Turning now to FIG. 2, a schematic for a portable IHS 200 is illustrated according to one aspect of the present disclosure. The portable IHS may include a battery 210, which may include a battery management unit (BMU) 220. The battery may provide one source of power to the portable IHS 200 and may be recharged, such as by an external power supply, for multiple uses. The BMU 220 may be a microprocessor and/or a controller incorporated in a battery 210. The BMU 220 may also be utilized when charging the battery 210 and may monitor charging conditions such as temperature, charge current, and charge voltage in a battery pack. Furthermore, the BMU 220 may be configured to manage charging cycles for the battery 210.

Additionally, the BMU 220 may include a detector pin 230. Typically, when the battery 210 is not coupled to the portable IHS 200, the detector pin 230 may be placed in a floating state, i.e., the detector pin 230 is not coupled to any power source. While the detector pin 230 is in the floating state, the BMU 220 may remain in a standby mode. Placing the BMU 220 in the standby mode may disable the battery 210 from outputting power. Thus, while the battery 210 is not coupled to the portable IHS 200, the BMU 220 will remain in the standby mode, and the battery 210 will be disabled from outputting any power.

Certain events may cause the detector pin 230 to be configured to a different state. In conventional systems, coupling the battery 210 to the portable IHS 200 may trigger a change in the state of the detector pin 230, such as being placed in a logical low state, for example, to enable the battery 210 to provide power to the portable IHS 200. For example, in some systems, coupling the battery 210 to the portable IHS 200 will in turn cause the detector pin 230 to be coupled to ground. As such, the detector pin 230 may be placed in a logical low state, thereby indicating to the BMU 220 to exit the standby mode. Once the BMU 220 is activated, the battery 210 may be enabled to provide power to the portable IHS 200.

Furthermore, the events described above, i.e., the BMU exiting standby mode while the battery 210 is coupled to the IHS, may occur while the portable IHS 200 is switched off. According to the Advanced Configuration Power Interface (ACPI), the power state corresponding to such a scenario may be referred to as an S5 state. In the S5 state, an IHS may not have any context saved as may be the case during IHS hibernation or IHS standby. However, some level of power may still be provided to the IHS in order to power on the IHS via input from one of its components, such as a keyboard, clock, modem, or the like. Additionally, in some instances, the S5 state may be referred to as the G2 state and/or a "soft off."

On the other hand, in the situation where an IHS is switched off, and the BMU remains in standby mode, the IHS may then be considered by the ACPI to be in the G3 state. While the IHS is in the G3 state, its power consumption may approach zero. As such, the IHS may be considered safe for disassembly. Those of ordinary skill in the art may also refer to the G3 state as a "mechanical off."

Certain inefficiencies, however, may arise from the conventional implementation described above. Because the detector pin 230 is continuously coupled to ground while the battery 210 is coupled to the portable IHS 200, the battery 210 may experience small but continuous current leakage. Such leakage may occur despite the fact that the portable IHS 200 may be switched off or powered down. For example, certain components such as capacitor 285, digital logics (not shown), the BMU 220, and/or the like may draw current from the battery 210 even while the portable IHS 200 is maintained in an off state. If such current leakage occurs without support of an external power supply coupled to the portable IHS to charge the battery 210, the capacity and overall life of the battery 210 may be greatly diminished over time.

A typical instance of such a scenario arises during the retail distribution of the portable IHS 200. For example, the portable IHS may be packaged in order to be sold at a retail location. While the portable IHS 200 remains at the retail location and has yet to be sold to a customer, the battery 210 may remain coupled to the portable IHS 200, thereby leaking current. Another instance may occur simply when a user leaves the battery 210 coupled to the portable IHS for an extended period of time without coupling an external power supply. Both events may lead to a significant decrease in the life and capacity of the battery 210.

Therefore, FIG. 2 provides a portable IHS 200 capable of reducing current leakage in the battery 210. In contrast to conventional implementations, the present disclosure contemplates a system in which the battery 210 may not be enabled to provide power merely by coupling the battery 210 to the portable IHS 200. To this end, the detector pin 230 may be configured to remain in the floating state even while the battery 210 is coupled to the portable IHS 200. In turn, the BMU 220 may remain in the standby mode while the battery 210 is coupled to the portable IHS 200, thereby disabling battery power. As such, having the battery 210 coupled to the portable IHS 200 may not alone enable the battery 210 to provide power to the portable IHS 200. Indeed, another event may also need to occur before the battery power is enabled.

In one implementation, battery power may be enabled, while the battery 210 is coupled to the portable IHS 200, when an external power supply e.g., an AC Adaptor, is coupled to the portable IHS 200. For example, an external power supply may be coupled to the portable IHS 200 via the external power supply port 240. Furthermore, a control switch 250 may be in communication with the external power supply and the detector pin 230 of the battery 210. While the control switch 250 is illustrated as a Metal-oxide Semiconductor Field Effect Transistor (MOSFET), any suitable control switch or component may also be used to provide similar functionality. To this end, the control switch 250 may provide control to the state of the detector pin 230. For example, while the control switch 250 is switched off, the detector pin 230 may be configured or remain at the floating state. Thus, the BMU 220 may be maintained in standby mode. If the control switch 250 is switched on, however, the detector pin 230 may be configured to a first predetermined level, which may cause the BMU 220 to exit standby mode, thereby enabling the battery 210 to provide power. Thus, the BMU 220, via the detector pin 230, may not automatically exit the standby mode upon coupling the battery 210 to the portable IHS 200.

In particular, coupling the external power supply to the portable IHS 200 via the external power supply port 240 may provide the voltage necessary to switch on the control switch 250. In one implementation, switching on the control switch 250 may cause the detector pin 230 to be coupled to ground, thereby placing the detector pin 230 in a logical low state. As a result, the BMU 220 may be activated to exit standby mode and enable the battery 210 to provide power.

Furthermore, if the external power supply is coupled to the portable IHS 200, the external power supply may then provide the primary source of power to activate the embedded controller 270. The embedded controller 270 may reside on the portable IHS 200 and may be in communication with the BMU 220 while the battery 210 is coupled to the portable IHS 200. Typically, the embedded controller 270 may be responsible for activating and/or powering on various devices and components in the portable IHS 200. To this end, the embedded controller 270 may be activated by applying a predetermined voltage, generally known in the art as approximately +3V ALW, at Vin 272. In addition, when the external power supply is coupled to the portable IHS 200, the embedded controller 270 may communicate with the BMU 220 to determine whether to charge the battery 210, and then proceed to do so if needed.

In another example, battery power may be enabled, while an external power supply is not coupled to the portable IHS 200, by activating a power switch 260. For instance, the battery 210 may be required to provide power to the portable IHS 200 while an external power supply is not coupled and when the portable IHS 200 is switched on via activating the power switch 260. To this end, the power switch 260 may be in communication with the detector pin 230 of the battery 210 and also with the embedded controller 270. The power switch 260 may be activated by various means including, but not limited to, pressing a power button, using a peripheral device such as a keyboard or mouse, and/or using other technologies such as Wake on Local Area Network (Wake on LAN).

As shown in FIG. 2, activating the power switch 260 may cause the detector pin 230 to be coupled to ground via the path through diode 290. As previously mentioned, coupling the detector pin 230 to ground may cause the BMU 220 to exit standby mode and enable the battery 210 to provide power to the portable IHS 200. In certain implementations, however, the power switch 260 may be a toggle switch, i.e., any activation of the power switch 260 may be followed shortly by deactivation of the power switch 260. For example, the power switch 260 may be coupled to a power button (not shown) in which the power switch 260 is activated as long as the power button is depressed, but is deactivated when the power button is released. To this end, a typical occurrence of pressing and releasing the power button may be completed in less than one second. Additionally, in a conventional implementation, deactivating the power switch 260, or releasing a power button for example, may cause the detector pin 230 to again be configured to a floating state. In response, the BMU 220 may enter standby mode, thereby disabling battery power even while battery power may still be necessary to operate the portable IHS 200.

Thus, in order to keep the BMU active, i.e., not in standby mode under this circumstance, the battery 210 may provide the predetermined voltage, e.g., +3V ALW, necessary to activate the embedded controller 270. Moreover, the battery 210 may activate the embedded controller 270 upon activation of the power switch 260 and before deactivation of the power switch 260, or for example, between pressing and releasing a power button. While the +3V ALW has not been applied, the power pin 276 may be in a logical low state via resistor 280. However, in response to the +3V ALW being applied to the embedded controller 270 via the battery 210, the power pin 276 in the embedded controller 270 may be placed in a logical high state. As a result, the embedded controller 270 may generate an activation signal via an activation signal pin 274. To this end, the activation signal may then provide a voltage to continuously maintain the control switch 250 in an ON state, thereby maintaining the detector pin 230 coupled to ground, e.g., a logical low state. Notably, the activation control signal may continuously provide such a voltage to the control switch 250 even after the power switch 260 has been deactivated. In this manner, after the power switch 260 has been deactivated, the BMU 220 may nevertheless remain active, and battery power to the portable IHS 200 may remain enabled.

While references throughout the disclosure have been made regarding placing the detector pin 230 in a logical low state, it should be noted that the present disclosure contemplates placing the detector pin 230 in any state that would indicate or cause the BMU 220 to exit standby mode. Similarly, though references have been made to placing the power pin 276 of the embedded controller 270 in a logical low state, the present disclosure contemplates placing the power pin 276 in any state that would cause the embedded controller 270 to generate the activation signal.

Furthermore, it should also be noted that once the portable IHS 200 is switched off or powered off, the detector pin 230 may once again be placed in a floating state if an external power supply is not coupled to the portable IHS 200. Again, the BMU 220 may then enter standby mode and disable the output of battery power. Thus, in circumstances where the portable IHS 200 is left switched off without a coupled external power supply for an extended period of time, the portable IHS 200 may be capable of reducing and/or preventing battery leakage while the battery 210 is coupled to the portable IHS 200.

Additionally, references have been made to activating the embedded controller 270, either via the external power supply or the battery 210, with a predetermined voltage level, e.g., +3V ALW. While FIG. 2 does not show the respective circuitry that may be necessary for the external power supply and the battery 210 to provide the voltage, such circuitry is generally well known and its application would be understood by one of ordinary skill in the art.

Figure 3:
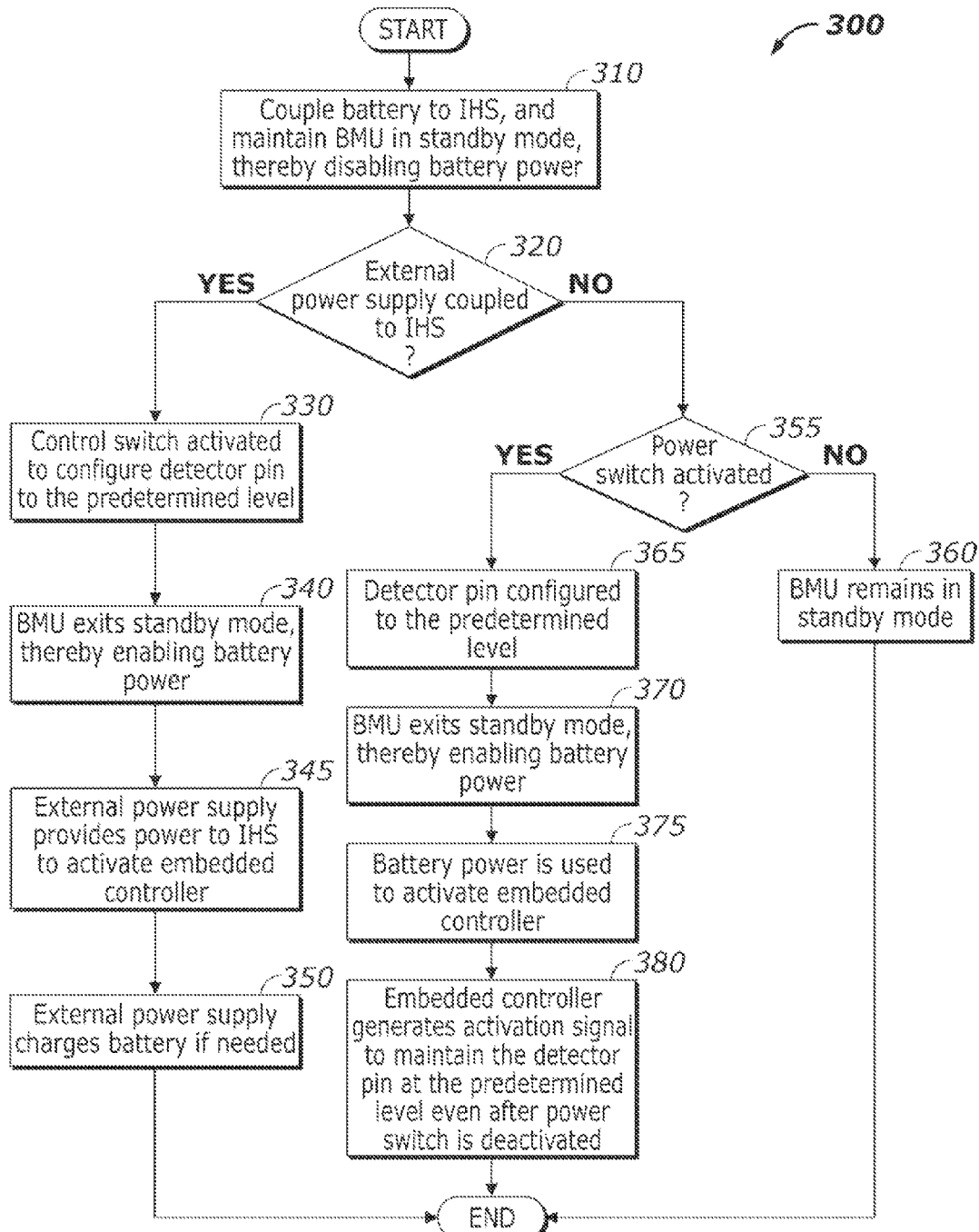
FIG. 3 provides a flow diagram illustrating a method for reducing battery leakage in an IHS in accordance with one aspect of the present disclosure.

Turning now to FIG. 3, a flow diagram is provided that illustrates a method 300 for reducing battery leakage in an information handling system. The method 300 may begin in step 310, where a battery may be coupled to the IHS, and the BMU may remain in standby mode. Thus, battery power may be disabled to the IHS even while the battery is coupled to the IHS. As previously mentioned, this may be in direct contrast to conventional implementations, which may have the BMU exit standby mode once the battery is coupled to the IHS.

In step 320, a determination may be made as to whether an external power supply has been coupled to the IHS. If so, a control switch may be activated to configure the detector pin to a predetermined level in step 330. As described with reference to FIG. 2, the external power supply may provide the voltage needed to continually maintain the control switch switched on. Furthermore, the predetermined level may in some implementations be a logical low state, such as +3V ALW.

Next, in step 340, the BMU may exit standby mode in response to the configuration of the detector pin at the predetermined level, thereby enabling battery power to the IHS. In step 345, the external power supply may provide power to activate the embedded controller. Thus, the embedded controller may be enabled to power on other devices and/or components in the IHS. The embedded controller may then communicate with the BMU to charge the battery, if necessary, via the external power supply in step 350.

If on the other hand, an external power supply is not coupled to the IHS, a determination is made as to whether a power switch in the IHS has been activated in step 355. If not, the BMU remains in standby mode, where battery power is disabled to the IHS. Thus, battery leakage may be reduced and/or prevented while the IHS is switched off.

In step 365, activating the power switch may cause the detector pin to be configured to the predetermined level, e.g., a logical low state. In response, the BMU may exit standby mode and enable battery power to the IHS in step 370. Subsequently, in step 375, the battery may provide power to activate the embedded controller. As previously mentioned, the battery may provide a voltage, generally known in the art as a +3V ALW, to activate the embedded controller. Once activated, the embedded controller may generate an activation signal, in step 380, via an activation signal pin. As previously described, the activation signal may continuously provide the voltage necessary to maintain the control switch switched on, thereby keeping the detector pin at the predetermined level even after the power switch has been deactivated.

Furthermore, methods of the present disclosure, detailed description and claims may be presented in terms of logic, software or software implemented aspects typically encoded on a variety of storage media or medium including, but not limited to, computer-readable storage medium/media, machine-readable storage medium/media, program storage medium/media or computer program product. Such storage media, having computer-executable instructions, may be handled, read, sensed and/or interpreted by a computer. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from What is clamed is:

1. A method for reducing current leakage in a battery in communication with an information handling system (IHS), the method comprising:
    providing an embedded controller in the IHS;
    providing a battery management unit (BMU) in the battery, the BMU in communication with the embedded controller, wherein the BMU comprises a microprocessor or controller and a detector pin, the BMU configured to manage charging cycles for the battery;
    placing the BMU in a standby mode to disable power from the battery to the IHS while the battery is coupled to the IHS;
    configuring the detector pin to a floating state when the BMU is in the standby mode; and
    configuring the BMU to exit the standby mode, if an external power supply is coupled to the IHS, to enable battery power from the battery to the IHS.

2. The method of claim 1 further comprising activating the embedded controller via the external power supply.

3. The method of claim 1 further comprising charging the battery if the external power supply is coupled to the IHS.

4. The method of claim 1, wherein configuring the BMU to exit the standby mode comprises configuring the detector pin to a predetermined level if an external power supply is coupled to the IHS.

5. The method of claim 4, wherein configuring the detector pin to the predetermined level comprises configuring the detector pin to a logical low state.

6. The method of claim 1, wherein placing the BMU in the standby mode comprises configuring the IHS to a G3 power state.

7. A method for reducing current leakage in a battery in communication with an information handling system (IHS), the method comprising:
    providing an embedded controller in the IHS;
    providing a battery management unit (BMU) in the battery, the BMU in communication with the embedded controller, wherein the BMU comprises a microprocessor or controller and a detector pin, the BMU configured to manage charging cycles for the battery;
    placing the BMU in a standby mode to disable power from the battery to the IHS while the battery is coupled to the IHS;
    configuring the detector pin to a floating state when the BMU is in the standby mode;
    activating a power switch in communication with the battery management unit and the embedded controller; and
    configuring the BMU to exit the standby mode to enable the battery to provide power to the IHS.

8. The method of claim 7, wherein configuring the BMU to exit the standby mode comprises configuring the detector pin to a predetermined level.

9. The method of claim 8, wherein configuring the detector pin to the predetermined level comprises configuring the detector pin to a logical low state.

10. The method of claim 7 further comprising:
    deactivating the power switch; and
    maintaining the detector pin at a predetermined level after deactivating the power switch.

11. The method of claim 10, wherein maintaining the detector pin at the predetermined level comprises generating an activation signal via the embedded controller.

12. The method of claim 7 further comprising:
    switching off the IHS; and
    placing the BMU in standby mode to disable battery power to the IHS while the IHS is switched off.

13. The method of claim 7, wherein placing the BMU in the standby mode comprises configuring the IHS to a G3 power state.

14. A system comprising:
    an information handling system comprising an embedded controller operable to initiate a power-on sequence in the IHS;
    a battery having a battery management unit (BMU), wherein the BMU is initially placed in a standby mode to disable battery power to the IHS, the BMU comprising a microprocessor or controller and a detector pin, the BMU in communication with the embedded controller and configured to manage charging cycles for the battery, the detector pin configured to a floating state when the BMU is in the standby mode;
    a power switch in communication with the embedded controller and the BMU; and
    a control switch configured to be switched on if an external power supply is coupled to the IHS or if the power switch is activated without the external power supply, wherein the BMU unit exits the standby mode if the control switch is switched on, thereby enabling battery power to the IHS.

15. The system of claim 14, wherein if the control switch is switched on, the detector pin is configured to a logical low state, thereby causing the BMU to exit the standby mode.

16. The system of claim 14, wherein if the external power supply is coupled to the IHS, the external power supply is configured to provide power to activate the embedded controller.

17. The system of claim 14, wherein the embedded controller comprises an activation signal pin operable to generate an activation signal to switch on the control switch.

18. The system of claim 17, wherein the activation signal pin is configured to generate the activation signal if the power switch is activated without an external power supply coupled to the IHS.

* * * * *